United States Patent [19]

Wupper

[11] Patent Number: 5,066,074
[45] Date of Patent: Nov. 19, 1991

[54] PROCESS AND CIRCUIT ARRANGEMENT FOR CONTROLLING THE SLIP WHEN BRAKING A ROAD VEHICLE

[75] Inventor: Hans Wupper, Friedrichsdorf, Fed. Rep. of Germany

[73] Assignee: Alfred Teves GmbH, Frankfurt am Main, Fed. Rep. of Germany

[21] Appl. No.: 938,335

[22] Filed: Dec. 4, 1986

Related U.S. Application Data

[63] Continuation of Ser. No. 781,334, Sep. 30, 1985, abandoned.

[30] Foreign Application Priority Data

Oct. 18, 1984 [DE] Fed. Rep. of Germany ....... 3438113

[51] Int. Cl.$^5$ ............................................... B60T 8/10
[52] U.S. Cl. .................................. 303/97; 303/111
[58] Field of Search .................... 303/95, 96, 97, 105, 303/106, 109, 110, 111, 100; 188/181 A, 181 R, 181 C

[56] References Cited

U.S. PATENT DOCUMENTS

| | | | |
|---|---|---|---|
| 3,825,799 | 7/1974 | Matsumura | 303/109 |
| 3,840,278 | 10/1974 | Fleischer et al. | 303/111 |
| 3,866,981 | 2/1975 | Klatt | 303/111 |
| 3,894,773 | 7/1975 | Cleveland et al. | |
| 3,918,767 | 11/1975 | Reinecke | 303/100 |
| 3,966,264 | 6/1976 | Mattori et al. | 303/100 |
| 4,374,421 | 2/1983 | Leiber | 303/111 |
| 4,489,382 | 12/1984 | Jonner et al. | 303/110 |

FOREIGN PATENT DOCUMENTS

| | | |
|---|---|---|
| 2112669 | 10/1972 | Fed. Rep. of Germany . |
| 2333127 | 1/1975 | Fed. Rep. of Germany . |
| 2855326 | 7/1980 | Fed. Rep. of Germany . |
| 3201047 | 6/1983 | Fed. Rep. of Germany . |
| 32099369 | 9/1983 | Fed. Rep. of Germany . |
| 2430874 | 2/1980 | France . |
| 2442165 | 6/1980 | France . |
| 2016621 | 9/1979 | United Kingdom . |
| 2026113 | 1/1980 | United Kingdom . |

*Primary Examiner*—Alvin E. Oberley
*Attorney, Agent, or Firm*—Robert P. Seitter; J. Gordon Lewis

[57] ABSTRACT

For controlling the slip when braking a road vehicle and in particular for improving control in case of different friction values on the right and left vehicle sides the rotational behavior of the front wheels and, as a measure of the vehicular velocity and vehicular deceleration, the rotational behavior of the rear wheel running with a higher friction value are observed. The rotational behavior of the front wheels and the vehicular deceleration are evaluated in accordance with criteria manifesting the danger of yawing moments which are excessive with respect to the driving stability of the vehicle. Upon reaching a predetermined vehicular deceleration threshold value representative of high yawing moments, any further yawing moment increase is restricted by limiting the braking pressure or the braking pressure increase at the front wheel having a better road surface contact. Thereby, for a certain period, the yawing moment is limited to a value which is manageable by the driver and which permits the required steering reactions in order to prevent perilous yawing angles within normal reaction times.

7 Claims, 2 Drawing Sheets

PROCESS AND CIRCUIT ARRANGEMENT FOR CONTROLLING THE SLIP WHEN BRAKING A ROAD VEHICLE

This application is a continuation of application Ser. No. 06/781,334, filed Sep. 30, 1985, now abandoned.

BACKGROUND OF THE INVENTION:

This invention relates to a process for controlling the slip when braking a road vehicle, and more particularly, for improving control in case of different adhesive or friction values on the right and left sides of the vehicle. The rotational behavior of the vehicle's wheels and the vehicular velocity or derived measured values are detected. The corresponding signals are logically combined as well as processed and, upon the instabilization of a wheel such as upon the occurrence of a lock-up tendency, the braking force at the respective wheel is kept constant or reduced and is thereafter reincreased. Circuit arrangements for carrying out the process are provided by the present invention.

Many variations of processes and circuits of this type are known. By means thereof, the rotational behavior of individual wheels or of wheels combined in groups is measured during the braking operation. After the evaluation, such as after the processing and logical combination of the measured values while considering certain marginal conditions, there is an intervention in the braking pressure variation if lock-up tendencies are registered at any one or at several of the wheels due to an excessive braking force or due to an excessive braking pressure. Even under unfavorable conditions, in particular on slippery road surfaces, the brake slip is controlled to a value favorable for the braking behavior of the vehicle in order to prevent the dangers accompanying a wheel lock-up. That is, the danger of skidding and the loss of steerability of the vehicle while attempting to achieve a short stopping distance.

Particular difficulties are encountered in rating control for road conditions where the friction values between the tires and the road surface vary widely between the right and left vehicle sides. For example, these situations prevail in the wintertime when the road surface is dry on the one side while localized accumulations of snow or ice can be found. Further, it is likely that by swerving around a critical situation that the vehicle has one of its sides on an unsurfaced road with a very bad adhesive value. If, in such situations, slip control rates the braking pressure for the two wheels of one axle in accordance with the vehicle side with the low adhesive value, there will be an excessive reduction of the braking pressure and the stopping distance thus will become excessive. In case of individual control of the two wheels of one axle which are running with very different adhesive values there will result a strong braking effect on the vehicle side with a good grip, and only on this side. Thus the braking effect will result in a high yawing moment which often cannot be compensated by the steering corrections of the driver. A slip control rated for a short stopping distance thus endangers the driving stability of the vehicle in such situations.

In order to reduce this effect it has been suggested to install a pressure limiting device in the pressure medium supply system of a slip-controlled brake system. The pressure limiting device directly compares the controlled braking pressures of the two wheels of one axle and influences the higher controlled braking pressure when a certain pressure difference is exceeded (German Patent Specification=DE-PS No. 23 33 127). It is disadvantageous in such an anti-skid control system that the pressure difference limitation is effective and lengthens the stopping distance even when, due to the road conditions, the controlled pressure, which is not limited, would not lead to a yawing moment or to only a small yawing moment. On the other hand, in unfavorable situations, the rigidly predetermined response pressure difference may not be sufficient to prevent the yawing moment as in this case the condition of the wheel brakes may result in erroneous friction value, friction radius, etc.

It is, therefore, an object of this invention to develop a process for controlling the brake slip which, in all practical situations, prevents the formation of a yawing moment dangerous to the vehicle and which at the same time ensures a high adherence ability of the wheel running with a high friction value and thus enables a short stopping distance to be achieved.

SUMMARY OF THE INVENTION

It has been found that this object can be attained in a simple and technically advanced manner by a process of the type described with the further development wherein the rotational behavior of the wheels and the vehicular deceleration are evaluated in accordance with criteria manifesting the danger of yawing moments impairing the driving stability of the vehicle. When a predetermined yawing moment threshold value, or a corresponding measured value, is reached, any further increase of the yawing moment is restricted by limiting the braking force, such as by keeping the braking force constant or by reducing it, or by diminishing the increase of the braking force at the front wheel having a better contact with the road surface.

According to an advantageous embodiment of this invention, the same braking force is applied to the rear wheels of the vehicle, control of the braking force (in accordance with the "select-low" principle) depending on the slip of the rear wheel having a worse contact with the road surface, and the deceleration of the rear wheel with a better contact with the road surface is evaluated as a measure of the vehicular deceleration when ascertaining the criteria for determining the yawing moments. When the friction values differ greatly between the right and left vehicle sides, the wheel running with a high friction value is applied with a relatively low braking pressure and thus will run almost free so that it will accurately follow the velocity and the deceleration of the vehicle over a wide range.

Further, according to the present invention, it is possible to evaluate the value of the vehicular deceleration at the time of the first instability (i.e., at the time of the first occurrence of a lock-up tendency at one of the front wheels) as a criteria of the danger of yawing moments impairing the driving stability. A vehicular deceleration of under approximately 0.3 to 0.4 g until the time of the first instability is potentially dangerous with respect to the occurrence of a perilous yawing moment.

According to a further embodiment, the difference possible at the maximum between the friction values of the two vehicle sides, which difference may be derived from the momentary vehicular deceleration at the time of the first instability, is evaluated as a criteria of excessive yawing moments. With the vehicular deceleration being high (for example, above 0.3 to 0.4 g) upon the first occurrence of an instability, the friction value on the road surface side with a worse road surface contact is also high enough that even in case of a full adherence ability at neither of the front wheels, yawing moments can be tolerated as perilous high yawing moments can develop only in case of very different adhesive value conditions on the two vehicle sides. In this case, therefore, the yawing moment variation is put out of operation.

According to a further embodiment of the present invention, in the initial phase of braking, upon the instabilization of a front wheel due to a low friction value lying under a predetermined limit (for example, 0.2 to 0.3) the braking force increase at the second front wheel is continued with a gradient slightly reduced by (for example, 10 to 30%) as long as the rotational behavior of the second front wheel is stable, and until a further braking force limit value or vehicular deceleration limit value is reached which corresponds to the permissible yawing moment. After having reached this limit value the braking force increase is limited to a value coordinated with the yawing angle velocity which may be compensated by the driver by steering corrections.

The invention is thus based on the finding that a considerable improvement in control in case of different friction values on the right and left sides of the vehicle can be achieved if from the rotational behavior of the wheels and from the deceleration of the vehicle (which, under certain conditions, may be measured very easily by monitoring a wheel) conclusions are drawn with regard to the danger of yawing moments. By intervening in control, the yawing moment is limited while the driver is provided with information that a reaction is required. Any further increase of the yawing moment will then take place very slowly. That is, at a rate leaving the driver sufficient time for reaction. On the other hand, countersteering (i.e., the cooperation of the driver) permits the braking force to increase further on the side with a high friction value. Accordingly, the adhesive value of this vehicle side is utilized in a far-reaching manner with the purpose of achieving a short stopping distance.

The dependence of the limitation of the yawing moment on the described criteria also ensures that the intervention in the braking pressure variation or in slip control will indeed take place only if there is a danger to the driving stability of the vehicle.

BRIEF DESCRIPTION OF THE DRAWING

Further characteristics, advantages, and applications of this invention will become evident from the following description of embodiment when taken in conjunction with the accompanying drawing wherein.

DETAILED DESCRIPTION

Figure 1:
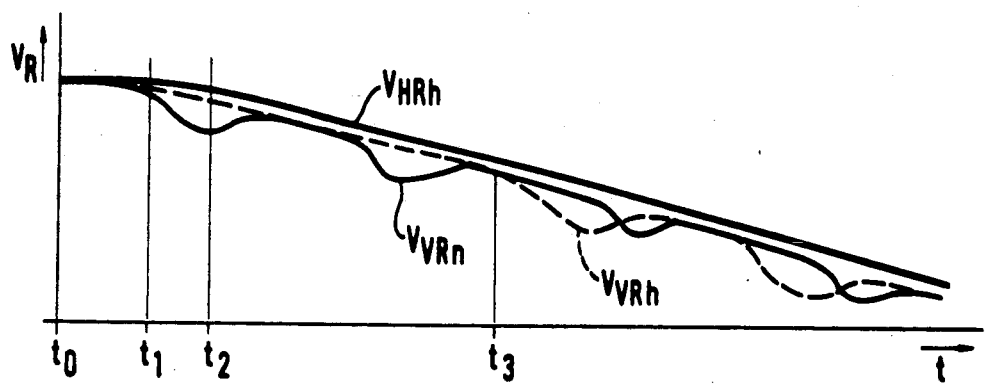
FIG. 1 is a diagram showing the wheel velocities, traced above time, during the initial phase of braking on a road surface with highly differing friction values on the right and left vehicle sides.
Figure 2:
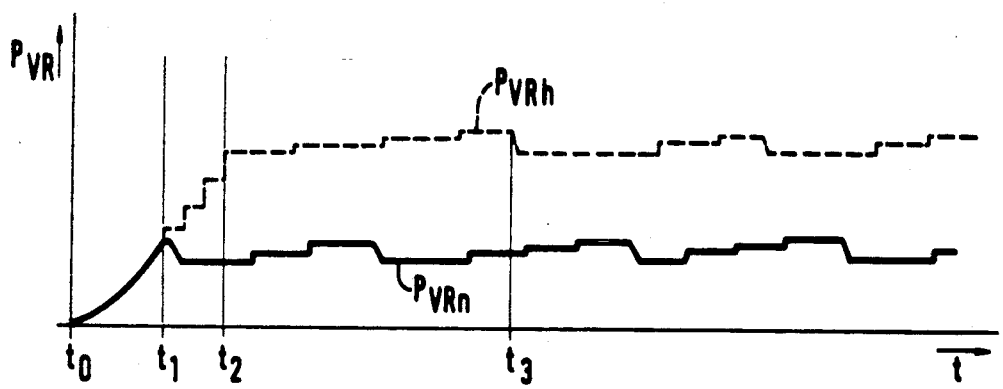
FIG. 2 shows the braking pressure variation at the front wheels during the braking operation in accordance with FIG. 1, the time scale being the same.
Figure 3:
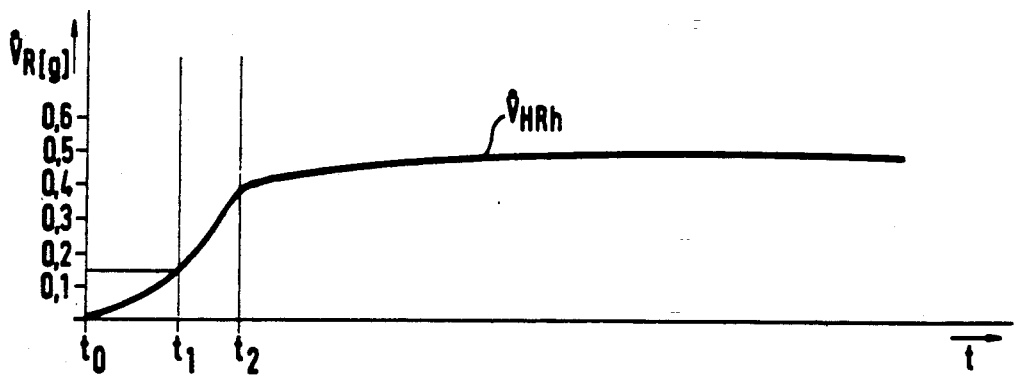
FIG. 3 shows the deceleration of the rear wheel running with a high friction value during the initial phase of braking in accordance with FIGS. 1 and 2, the time scale likewise being the same.

The diagrams represented in FIGS. 1 through 3 illustrate the rotational behavior of the wheels, the pressure variation, and the deceleration during an initial phase of braking with different friction values on the right and left sides, where the inventive yawing moment variation becomes effective.

The velocity of the rear wheel running with a high friction value is marked $v_{HRh}$. At the time of reference, said velocity is practically identical with the vehicular velocity; especially so since as in the case described here, due to the known "select-low" control, the braking pressure at the rear axle depends on the wheel having a worse contact with the road surface. The rear wheel on the high-friction-value side is thus applied with a relatively low braking pressure so that a small or an approximately constant slip may result at the most.

The broken-line curve in FIG. 1 relates to the velocity $v_{VRh}$ of the front wheel running with a high friction value. The continuous curve $v_{VRn}$ relates to the variation of the front wheel running with a low friction value. The velocity of the second rear wheel running with a low friction value is not illustrated as the rotational behavior of said wheel is of minor importance for the inventive yawing moment variation. The road surface contact of this rear wheel only limits the amount of the braking pressure which may be supplied in the wheel brakes of the rear wheels.

In FIG. 2 the braking pressure variation $p_{VRh}$ of the front wheel running with a high friction value is likewise represented by a broken line. The pressure variation $p_{VRn}$ of the wheel exposed to the low friction value is illustrated by a continuous line.

FIG. 3 illustrates the deceleration $v_{HRh}$ of the underbraked wheel as said deacceleration is required for the determination of the vehicular velocity and, derived therefrom, of the vehicular deceleration and thus for the yawing moment variation. In FIG. 3, the deceleration units are g which is the constant of the acceleration due to gravity of approximately 9.81 m/sec$^2$.

In the example referred to by FIGS. 1 through 3 the braking operation considered here starts at the time $t_0$. A first instability detected by an excessive wheel deceleration and/or excessive slip is noted at the time $t_1$. Slip control sets in and, after a short delay, leads to the reduction and, subsequently, to constant braking pressure $p_{VRn}$.

As the first instability occurs as early as after a relatively small vehicular deceleration of approximately 0.15 g (refer to FIG. 3), the adhesive value conditions at this wheel are thus very bad. This constitutes a criteria of the danger of excessive yawing moments since the adhesive value at the other front wheel, which control has no information on as yet at the time $t_1$, might be considerably higher. Theoretically, a stable slowing-down with 1.0 g at the maximum might be possible at the second front wheel.

Following time $t_1$, at first the braking pressure build-up at the second front wheel running with a high friction value is continued at a but slightly reduced rate. For the vehicle, this results in a yawing moment increase which, however, is not yet endangering the driving stability. Thereby, the steering and the behavior of the vehicle provide the driver with information on the increasing yawing moment. He has sufficient time to face this situation and to react by countersteering.

However, the second front wheel whose characteristic lines in FIGS. 1 and 2 are broken lines and which is running stable despite the braking pressure's continuing increase could imply dangerous yawing moments. Therefore, at time $t_2$, as a function of the momentary wheel deceleration $v_{HRh}$ corresponding to the vehicular deceleration and on the deceleration at time $t_1$ of the first instability or rather on the friction value derived from the rotational behavior of the wheel and from the pressure, a further measure sets in on the worse-road surface-contact vehicle's side in order to influence the yawing moments. Namely, although the second front wheel still does not show any lock-up tendency, at time $t_2$ the further increase of the braking pressure $p_{VRh}$ is interrupted and continued with but a very small gradient. Following $t_2$, the yawing moment will increase but so slowly that the driver may keep up the driving stability of the vehicle without any difficulty by means of reasonable steering corrections.

At time $t_3$, in the case described here, a lock-up tendency also results at the front wheel running with a high friction value. Therefore slip control reduces the braking pressure $p_{VRh}$, keeping it constant on a pressure level which is high as compared with the front wheel having a worse road surface contact and reincreasing it when necessary. Dangerous yawing angles are no longer to be expected due to the steering corrections meanwhile initiated by the driver, thus the further braking pressure variation only being determined by the instabilization of the individual wheels.

Figure 4:
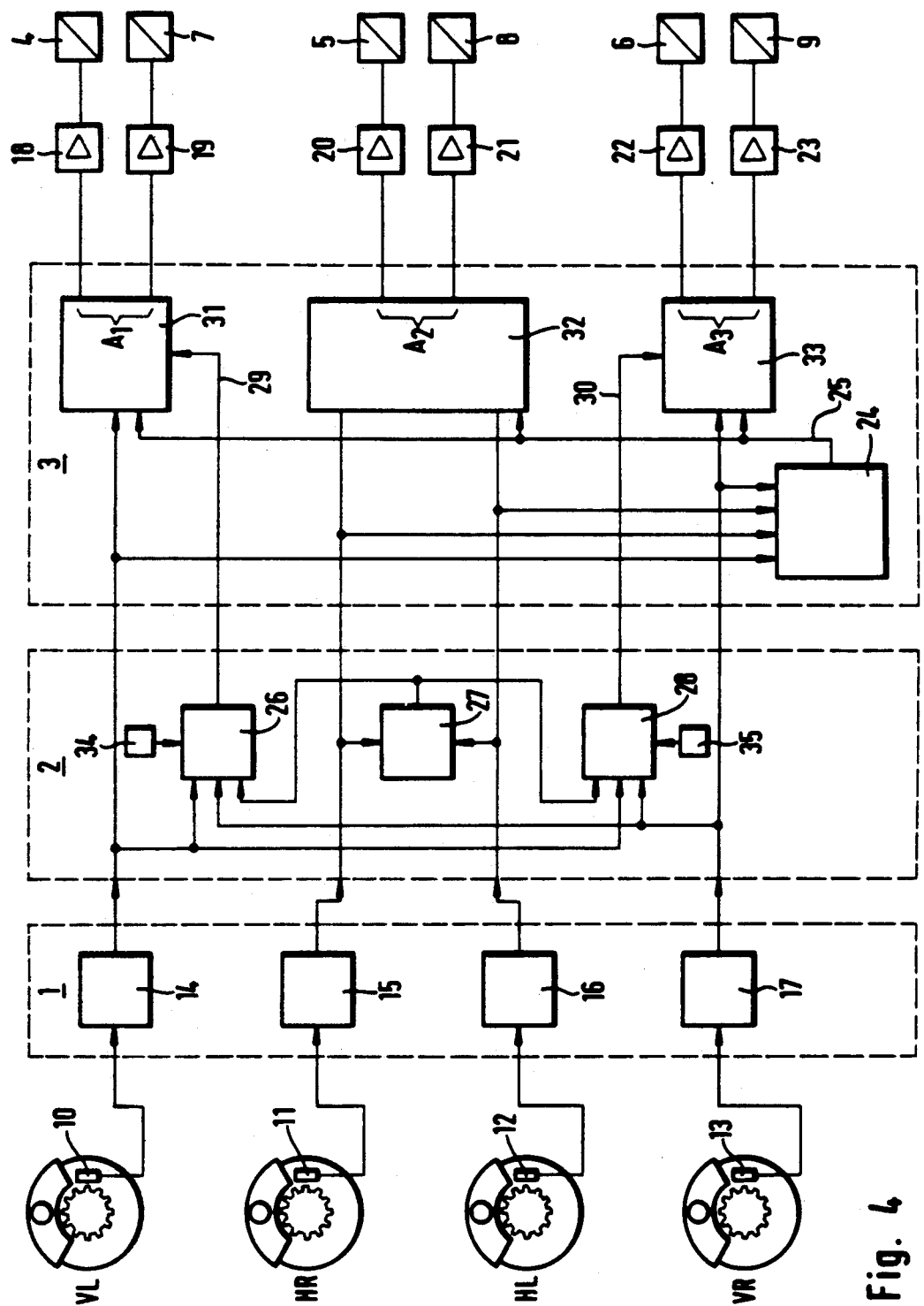
FIG. 4 is the block diagram of an embodiment of a circuit arrangement for carrying out the inventive process.

In FIG. 4 an embodiment of an electric circuit arrangement is represented by means of which, within the scope of slip control, it is possible to prevent the formation of dangerous yawing moments due to different adhesive values on the right and left vehicle's sides.

According to this representation the electronic components mainly are combined to three electronic units 1, 2, 3 by means of which electric signals for control of inlet valves 4 through 6 and outlet valves 7 through 9 in the pressure medium path of a (non-illustrated) hydraulic or pneumatically operated brake system are derived from the electric signals or information on the rotational behavior of the individual wheels. By means of such valves it is possible to reduce the braking pressure or to prevent any further increase of the braking pressure when a lock-up tendency is registered.

The rotational behavior of the front wheels VL, VR and of the rear wheels HR, HL in this arrangement is measured by means of inductive transducers 10 through 13 generating an electric signal the frequency of which is proportional to the rotation of the wheel. After the processing, amplifying, and filtering of the sensor signals in the respective input circuit 14 or respectively 15, 16, or 17, the output signals are fed to an electronic combinational logic and signal processing stage 31 or 32, 33, respectively, at the outputs $A_1$, $A_2$, $A_3$ of which braking pressure control signals are available. After the amplification of said signals in the power amplifiers 18 through 23, by means of said signals there will be a switching-over of the braking pressure control valves, i.e., the inlet and outlet valves 4 through 9 designed as electromagnetically operable 2/2-way valves, for the calculated periods. In the example described here the braking pressure is individually controlled at the front wheels VL, VR by way of the valve pairs 4, 7 and 6, 9, respectively, while the brakes of the rear wheels HR, HL are provided with a common valve pair 5, 8. In this arrangement, the rear wheel braking pressure is expediently determined according to the "select-low" selection process. Thus the rear wheel braking pressure always depends on the wheel having a worse road surface contact.

The electronic unit 3 further contains a combination circuit 24 which is supplied with the processed velocity information of all the wheel sensors 10 through 13 and which generates a reference value from this information in accordance with a predetermined algorithm. Said reference value is fed to the circuits 15, 16, and 17 by way of the signal line 25. In said circuits it is compared with the rotational behavior of the individual wheels.

The circuits required according to this invention for improving control in case of different adhesive values on the right and left vehicle's sides or rather for preventing dangerous yawing moments are combined in the electronic unit 2 and consist mainly of several electronic circuits 26 through 28 fed with the processed sensor signals. By way of signal lines 29, 30, the outputs of the circuits 26 and 28 communicate with the input of the combinational logic and signal processing stage 31 and 33, respectively, the output signals of which influence the braking pressure variation in the brakes of the two front wheels VL, VR. When registering situations that may imply perilous yawing moments there will be a signal at the outputs of the circuits 26 or 28 or rather on the signal lines 29 or 30. Said signal, e.g., reduces any further braking pressure increase at the front wheel having a better road surface contact and thus reduces the increase of the yawing moment in this phase of braking to a value that is not endangering the driving stability and may be compensated by countersteering.

According to FIG. 4, the two circuits 26 and 28 of the yawing moment variation circuit, i.e. of the electronic unit 2, are fed with the processed signal of the two front wheels VL, VR. The rotational behavior of the two rear wheels HR, HL, on the other hand, at first is evaluated in the circuit 27, only that signal being selected and fed to the third inputs of the circuits 26, 28 that represents the velocity of a derived value of the faster rear wheel HR or HL running with a higher friction value. As already explained, it is namely possible to most accurately determine the velocity and the deceleration of the vehicle during this initial phase of braking from the rotational behavior of the fastest rear wheel.

Further, counters or comparators 34, 35 or other stages are connected to the circuits 26, 28 within the electronic unit 2 containing the components for the yawing moment variation, said counters or comparators 34, 35 or other stages determining the threshold values for the response of the yawing moment variation. In the example described with reference to FIGS. 1 through 3, the yawing moment threshold value is reached at time $t_2$, the yawing moment variation being put into operation.

For carrying out this inventive process and for realizing the embodiment represented as block diagram in FIG. 4, in particular the electronic units 2 and 3, both hardwired circuits and programmable circuits such as microcomputers are suitable.

What is claimed is:

1. A process for improving control during braking of a road vehicle by controlling the slip in the presence of different adhesive values on the right and left sides of the vehicle, wherein means are provided for detecting the rotational behavior of the vehicle wheels and the vehicular velocity to provide derived measured values in signal form and wherein the said signals are logically combined and processed and wherein, upon the instabilization of a wheel including the occurrence of a lock-up tendency, the signals independently control the braking force at said respective instable front wheel is kept at least constant and upon change in signal is thereafter reincreased, said process comprising the steps of evaluating the rotational behavior of the wheels (VR, VL, HR, HL) and the vehicular deceleration according to predetermined criteria manifesting the possibility of danger due to yawing moments which are capable of impairing the driving stability of the vehicle and wherein, when a predetermined yawing moment threshold value or a corresponding measured value is reached, restricting any further increase of the yawing moment by limiting the braking force, by keeping the braking force constant, or if the yawing moment continues by reducing said braking force, and by diminishing the degree of increase of the braking force at the front wheel which has a better contact with the road surface and further wherein the same said braking force is applied to the rear wheels (HR, HL) of the vehicle, wherein control of said braking force is a function of the slip signal of the rear wheel having a worse contact with the road surface, and wherein the deceleration ($v_{HRh}$) of the rear wheel with a better contact with the road surface is evaluated as a measure of the vehicular deceleration when ascertaining the criteria for determining the yawing moment.

2. A process as claimed in claim 1, wherein the value of the vehicular deceleration of the time ($t_1$) of the first instability, including the first occurrence of a lock-up tendency at one of the front wheels, is evaluated as said criteria of the danger of yawing moments impairing the driving stability of the vehicle.

3. A process as claimed in claim 2, wherein said vehicular deceleration of under approximately 0.3 to 0.4 g at the time of the first instability of one of the front wheels is evaluated as dangerous with respect to the occurrence of yawing moments impairing the driving stability.

4. A process as claimed in claim 1, wherein the difference between the friction value derived from said vehicular deceleration at the time of the first instability and the momentary friction value on the right and left side of the vehicle is evaluated as said criteria of the danger of yawing moments impairing the driving stability.

5. A process as claimed in claim 4, wherein a friction value on the bad-road-surface-contact side of above approximately 0.3 to 0.4 at the time of the first instabilization of a wheel is evaluated as being without danger with respect to the occurrence of yawing moments impairing the driving stability.

6. A process as claimed in claim 1, wherein upon instabilization of a front wheel due to a low friction value below said predetermined limit, the braking force increase at the second front wheel is continued at a reduced gradient, as long as the rotational behavior of said second front wheel is stable and until a braking force limit value and a vehicular deceleration limit value is reached which is indicative of the permissible yawing moment.

7. A process as claimed in claim 6, wherein after the braking force limit value and the vehicular deceleration limit value, which is indicative of the permissible yawing moment, has been reached the braking force increase is continued at a lower gradient coordinated with the yawing angle velocity which is compensated by the driver by steering corrections.

* * * * *